United States Patent
Vowe

(10) Patent No.: US 9,778,677 B2
(45) Date of Patent: Oct. 3, 2017

(54) BIT-TIMING SYMMETRIZATION

(71) Applicant: Infineon Technologies AG, Neubiberg (DE)

(72) Inventor: Achim Vowe, Munich (DE)

(73) Assignee: Infineon Technologies AG, Neubiberg (DE)

( * ) Notice: Subject to any disclaimer, the term of this patent is extended or adjusted under 35 U.S.C. 154(b) by 365 days.

(21) Appl. No.: 13/705,239

(22) Filed: Dec. 5, 2012

(65) Prior Publication Data

US 2014/0157035 A1    Jun. 5, 2014

(51) Int. Cl.
| | | |
|---|---|---|
| G06F 13/00 | (2006.01) | |
| G06F 1/12 | (2006.01) | |
| G06F 13/38 | (2006.01) | |

(52) U.S. Cl.
CPC .............. *G06F 1/12* (2013.01); *G06F 13/382* (2013.01)

(58) Field of Classification Search
CPC . H04L 2012/40215; H04L 2012/40234; H04L 12/44
See application file for complete search history.

(56) References Cited

U.S. PATENT DOCUMENTS

| | | | |
|---|---|---|---|
| 2003/0154418 A1* | 8/2003 | Vandensande | ................ 713/600 |
| 2006/0112204 A1* | 5/2006 | Casteignau | ............. H04L 12/40 710/100 |
| 2007/0024338 A1* | 2/2007 | Shumarayev et al. | ........ 327/175 |

* cited by examiner

*Primary Examiner* — Thomas Lee
*Assistant Examiner* — Vincent Chang
(74) *Attorney, Agent, or Firm* — Eschweiler & Potashnik, LLC

(57) ABSTRACT

A bus interface, for allowing a plurality of devices to communicate with one another via the bus, includes a bit timing symmetrization component for symmetrizing the bit stream. For an incoming bit stream, the bit timing symmetrization component further includes an input delay filter for delaying recessive to dominant edges for a given received bit stream and sampling the delayed input signal at the sample point. In one embodiment, bit timing synchronization may still be performed with the undelayed recessive to dominant edges. For an outgoing bit stream, the bit timing symmetrization component transmits a recessive bit, that followed a previously transmitted dominant bit, before the start of the next bit time, and transmits a dominant bit, that followed a previously transmitted recessive bit, with a delay of a configurable amount of time.

25 Claims, 3 Drawing Sheets

(BUS SYSTEM)

(BUS NODE)

BIT-TIMING SYMMETRIZATION

FIELD

The present invention relates to methods and systems for operating a bus system in an electrical or electronic system. More specifically, the invention relates to methods and systems for transmitting and receiving signals in a bus system.

BACKGROUND

A bus system, such as a controlled area network (CAN) or a local interconnect network (LIN) bus system, typically connects several electronic modules or devices via a network cable, such as a single twisted-pair cable. The devices connected to a CAN bus system are typically actuators, sensors or control devices, also known as nodes. The CAN bus system enables these nodes to communicate without the use of a host computer by transmitting and receiving messages. A message comprises primarily an identifier (ID) which indicates the priority of the message and up to eight bytes of data. Messages are transmitted serially onto the bus.

Each node typically comprises a host processor, a CAN controller and a transceiver. The host processor determines which messages to transmit and deciphers messages that are received. Sensors, actuators and control devices may be connected to the host processor. The CAN controller stores transmitted messages received from the host processor and stores received bits serially received from the bus until an entire message is available. The received message is then retrieved by the host processor usually after the CAN controller has triggered an interrupt. Each node also comprises a transceiver for receiving and transmitting messages between the CAN controller and the system bus. The transceiver adapts signal levels from the bus to levels that the CAN controller expects and further comprises protective circuitry for protecting the CAN controller. The transceiver also converts the transmit-bit signal received from the CAN controller into a signal that is sent onto the bus.

On the CAN bus, a dominant (logic 0) value on the bus is created by driving the CAN bus line with a low impedance driver. A recessive (logic 1) level is transmitted by releasing the bus line which allows the CAN node pullup resistor to pull the CAN bus line to logic 1 level. This occurs when all CAN nodes release the bus (i.e. transmit recessive level).

In conventional CAN bus systems, the pull up resistor of the CAN bus has a higher impedance than the dominant driver of any of the CAN nodes, and as a result, the bus transition from the dominant to recessive level (0 to 1) is much slower than a transition from a recessive to a dominant level (1 to 0). Thus, when a sequence comprising 0 1 0 appears on the CAN bus, the duration of the 1 period is significantly shortened because the beginning transition from 0 to 1 is delayed while the end transition from 1 to 0 is not delayed.

Conventional systems have dealt with this problem by shifting the point in time when the receiver samples the value of the currently received bit (also known as the sample point) towards the end of the bit time in order to catch the delayed recessive value. Unfortunately, a delayed sample point provides a smaller time margin for the next bit (which may be dominant and thus not delayed) which in turn narrows the synchronization margin. A narrowed margin interferes with either the high performance of the CAN bus system or the EMC of the system by limiting the CAN baud rate, decreasing oscillator tolerance of the CAN nodes, and/or the need to increase the speed of the CAN driver.

Therefore, there exists a need for a system and a method for operating a bus system that increases the bit rate and improves performance, increases the oscillator tolerance of CAN nodes, and/or enables slowing down the CAN driver/pullup for improved EMC behavior.

SUMMARY

In accordance with one aspect of the invention, there is provided a bus system for coupling a device to a bus and for receiving and transmitting a bit stream from and to the bus, the bus system comprising a bit timing symmetrization component for symmetrizing the bit stream. In one embodiment, the bit timing symmetrization component further comprises an input delay filter configured to delay the recessive to dominant edges for a given received bit stream. The system may be integrated within the bit timing logic of a bus controller and may utilize a dominant value and a recessive value that are configurable. In another embodiment, the bit timing symmetrization component provides for a recessive bit following a previously transmitted dominant bit to be transmitted before the start of the next bit time and/or provides for a dominant bit following a previously transmitted recessive bit to be delayed by a configurable amount of time.

In accordance with a further aspect of the invention, a method for symmetrizing the bit-timing of a bit stream comprises receiving a bit stream from the bus, and delaying recessive to dominant edges for a received bit stream. The method further comprises transmitting a recessive bit following a previously transmitted dominant bit before the start of the next bit time, and transmitting a dominant bit following a previously transmitted recessive bit with a delay of a configurable amount of time.

Further features, aspects and advantages of the present invention will become apparent from the following detailed description of the invention made with reference to the accompanying drawings.

BRIEF DESCRIPTION OF THE DRAWINGS

The accompanying drawings are included to provide a further understanding of the present invention and are incorporated in and constitute a part of this specification. The drawings illustrate embodiments of the present invention and together with the description serve to explain the principles of the invention. Other embodiments of the present invention and many of the intended advantages of the present invention will be readily appreciated as they become better understood by reference to the following detailed description.

DETAILED DESCRIPTION

In the following detailed description, reference is made to the accompanying drawings, which form a part hereof, and in which is shown by way of illustration specific embodiments in which the invention may be practiced. It is to be understood that other embodiments may be utilized and structural or other changes may be made without departing from the scope of the present invention. Therefore, the following detailed description is not to be taken in a limiting sense, and the scope of the present invention is defined by the appended claims.

Figure 1:
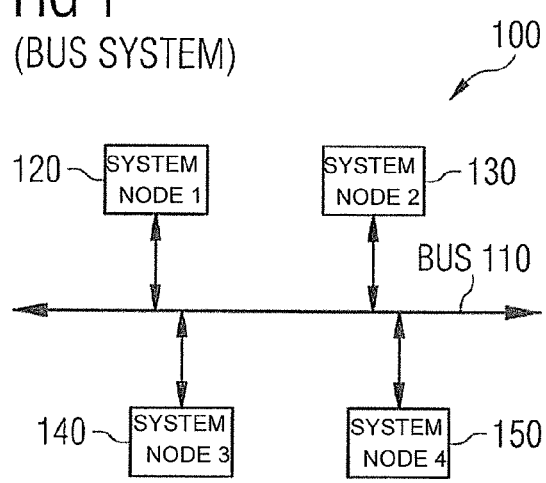
FIG. 1 shows an example schematic representation of a section of a bus system and a plurality of system modules communicating with one another via the bus system in accordance with one embodiment of the present disclosure.

FIG. 1 shows an example schematic representation of a section of a bus system 100 in accordance with the present invention. The system modules 120, 130, 140 and 150 are coupled to the bus 110 and communicate with one another via the bus 110. The system modules 120, 130, 140 and 150 may be any type of electronic module or device such as sensors, actuators and other control devices (hereinafter referred to as "node" or "nodes"). The following description will focus on a Controlled Area Network system (CAN) bus system for purposes of illustration, but one skilled in the art will realize that the bus system 100 of the present disclosure is not limited to any particular bus system but may comprise any of a number of other suitable bus systems, such as a Local Interconnect Network (LIN) bus system, which enable communication among the nodes 120, 130, 140 and 150.

The bus system 100 may comprise a data bus comprising one or more data lines for transmitting actual useful data, and/or an address bus comprising one or more address lines for the transmission of address data, and/or a control bus comprising one or more control lines for the transmission of control data. In one embodiment of the disclosure, the bus system 100 comprises a single transmission line 110 to which the plurality of system nodes 120, 130, 140 and 150 are coupled and useful, address and/or control data is transferred via the single transmission line 110.

In one embodiment of the present disclosure, one or more of the system nodes, 120, 130, 140 and 150, may comprise a mechatronic motor system in which one or more motors and their corresponding electrical components are housed. For example, the system modules may comprise bus transceivers, and/or corresponding voltage regulation devices, and/or corresponding actuator control devices, and/or corresponding sensor interfaces, and/or corresponding memory devices, and/or corresponding micro-controller and/or microprocessor systems, etc.

In accordance with one embodiment of the present disclosure, the bus system 100 advantageously improves the signal reception capabilities of the bus nodes and/or modifies the transmission bus signal. More specifically, the present disclosure provides a symmetrical digital delay to the receive bit sampling path and enables reshaping of the bus signal before transmission as will be described in more detail below. This bit-timing symmetrization advantageously increases the maximum baudrate of the bus system or increases the stability of the system for the same baudrate resulting in higher performance of the overall system. The present disclosure also improves the oscillator tolerance of the system modules or bus nodes thereby improving costs and system performance.

Figure 2:
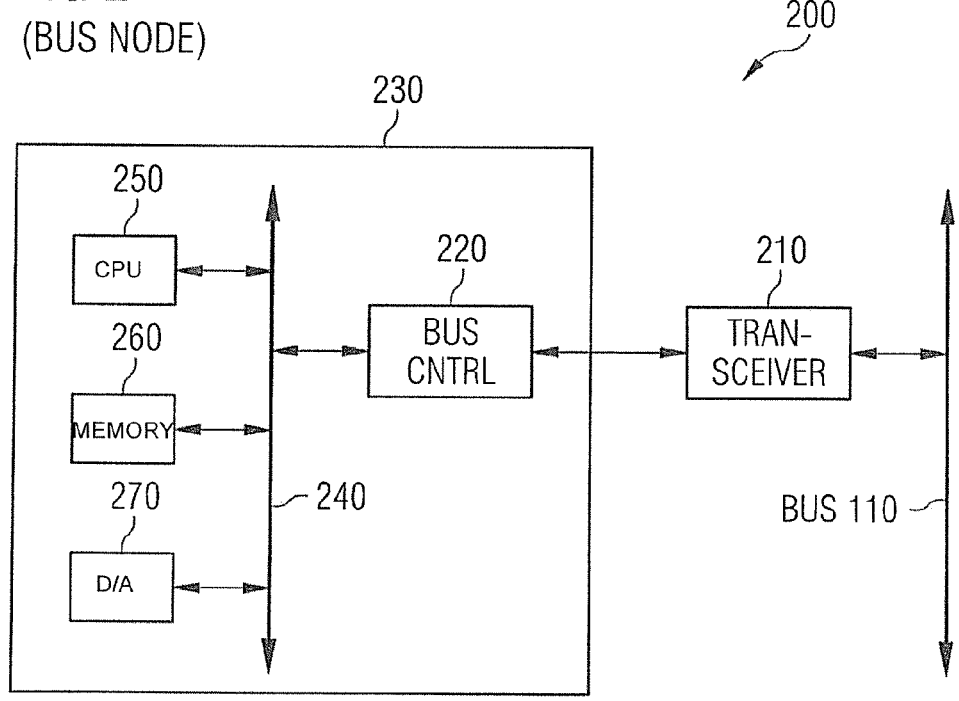
FIG. 2 shows an example schematic representation of a section of a bus node 200 in accordance with one embodiment of the present disclosure.

FIG. 2 shows an example schematic representation of a bus node 200 for connecting a device to the bus system 100 in accordance with the present invention. The bus node 200 comprises a transceiver 210, a bus controller 220 and a microcontroller 230. The bus controller 220 couples the microcontroller 230 to the bus 110. As shown in FIG. 2, the bus controller 220 comprises a component of the microcontroller 230 in one embodiment, but one skilled in the art will realize that the bus controller could also be formed on a dedicated chip.

The microcontroller 230 further comprises a plurality of other components 250, 260 and 270, which are coupled to one another via an internal bus 240. The components, 250, 260 and 270 may contain one or more CPUs, one or more memories and various peripheral units, such as an A/D converter, a D/A converter, a DMA controller, a timer and/or a USB interface. One skilled in the art will realize that the number of components is not limited to the three components illustrated but may include any number of components required for the microcontroller 230.

The transceiver 210 outputs data received by the microcontroller 230 via the bus controller 220 onto the bus 110 and forwards data received from the bus 110 to the microcontroller 230 via the bus controller 220. The transceiver 210 is also used for level conversion. In other words, the transceiver 210 converts the signals outputted by the microcontroller 230 into the appropriate levels and signal for transmission via the bus 110 and converts the signals received via the bus 110 into the appropriate levels required by the microcontroller 230. Thus, when a component of the microcontroller 230 wants to transmit data to another node coupled to the bus system 100, the microcontroller 230 transfers the data via an internal bus 240 in the microcontroller to the bus controller 220. The bus controller 220 converts the data into the prescribed format, such as a "frame", and outputs the frame onto the bus 110 via the transceiver 210. Similarly, the bus controller 220 receives frames from the bus 110 via the transceiver 210, checks whether the data in the frames are intended for the microcontroller 230, and if necessary, forwards the data extracted from the frame to the appropriate component within the microcontroller 230. The nodes 200 output the data onto the bus 110 at the same bit rate or with the same bit timing. Thus, in one embodiment the bus controller 220 may use preconfigured bit timing and delay values or may take appropriate measurements of the bus 110, and the nodes connected to the bus, or more specifically the bus controllers 220, need to be configured to take into account the bit rate of the system.

In accordance with one embodiment of the present disclosure, the signal reception and transmission capabilities of the node 200 are greatly improved by bit-timing symmetrization. More specifically, the present disclosure provides a symmetrical digital delay to the received bit sampling path and allows for reshaping of the bus signal before transmission. This advantageously increases the baudrate of the bus system or improves the stability of the system for the same baudrate, thereby resulting in higher performance of the overall system. The present disclosure also improves the oscillator tolerance of the system modules or bus nodes, thereby improving costs and system performance.

Figure 3:
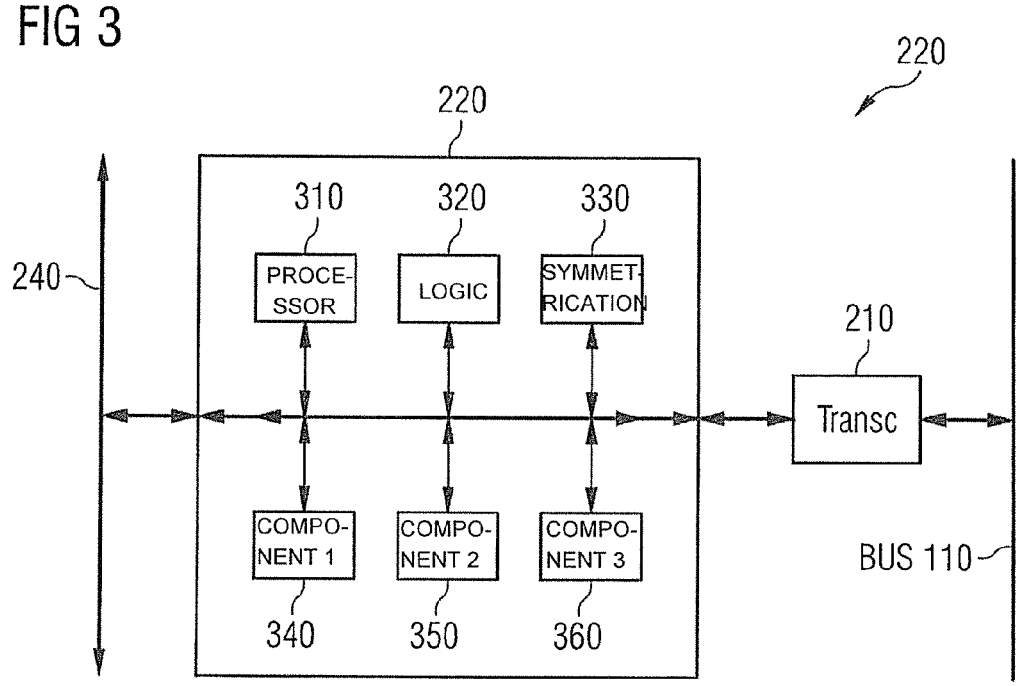
FIG. 3 shows an example block diagram of a bus controller 220 in accordance with one embodiment of the present disclosure.

FIG. 3 shows an example block diagram of a bus controller 220 and transceiver 210 in accordance with one embodiment of the present disclosure. The bus controller 220 comprises a bit stream processor 310, a bit timing logic 320, a bit timing symmetrization component 330 and various other components 340, 350 and 360 associated with a CAN protocol engine. Although the following description focuses on a CAN bus system for purposes of illustration, one skilled in the art will realize that the bus controller 220 of the present disclosure is not limited to any particular bus system, but may comprise any of a number of other suitable bus systems, such as a Local Interconnect Network (LIN) bus system, which enable communication among nodes.

The bit stream processor 310 ensures that the received or transmitted bit stream complies with the bus protocol, which in this case is the CAN protocol. The bit timing logic 320 produces synchronization with the bit stream transmitted via the bus and ensures the reception and transmission of the bit stream via the bus. The bit timing symmetrization component 330 acts on the received input signal and/or the transmitted signal to improve the symmetry of the bit stream as described in more detail below. The various other components 340, 350 and 360 may include, but are not limited to a Pre-scalar component for defining the Time Quanta, a frame counter and other components which would be known to one skilled in the art.

In one embodiment of the present disclosure the bit timing symmetrization component 330 comprises an additional filter for delaying the received input signal from the bus. Although the bit timing symmetrization component 330 is described herein as separate from the bit timing logic 320, it may also be combined and integrated into the bit timing logic circuitry 320. The additional filter of the bit-timing symmetrization component 330 captures the value of the original CAN received input (rxd_i) and delays this value for all falling edges. This delayed value is then sampled at the sample point instead of the original rxd_i value of prior art. Bit timing synchronization may still be performed with the original rxd_i, i.e. with the undelayed recessive to dominant edge. Thus, the present disclosure delays all recessive to dominant edges (i.e. 1 to 0 transitions) with the extra filter for bit sampling. The timing of all dominant to recessive edges (i.e. 0 to 1 transitions) remains intact and is not actively delayed by the present disclosure according to one embodiment.

Thus, the present disclosure advantageously symmetrizes the bus pulse train and increases the active time of a recessive bit, thus increasing the synchronization margin. Additionally, the sample point may also be shifted further to the end of the bit because the next dominant edge is delayed by the filter. Bit synchronization, which is typically done on the dominant edge, may still be done using the original received input (rxd_i).

More specifically, in accordance with one embodiment of the present disclosure, the input delay filter of the bit-timing symmetrization component 330 generates a delayed version of the original CAN received input signal (rxd_i) at the sample point:
rxd_delayed:=delay(rxd_i)

In one embodiment of the present disclosure, the sampled value may be the logical OR of the original received input signal (rxd_i) and the delayed version (rxd_delayed) since the present disclosure only delays the falling edge (i.e. 1 to 0 transition).
rxd_sampled:=rxd_delayed or rxd_i@t_samplepoint In one embodiment, the input delay filter allows for an asymmetric delay with a smaller delay for the rising edge to ensure that the shorter recessive bit will not be suppressed by the filter. The input delay filter may comprise a counter filter (filter_count), a configurable dominant limit value (dominant_limit) and a configurable recessive limit value (recessive_limit) and may run according to the following rules, which may be applied once per time quantum or any other specified time base.
selected_limit:=dominant_limit when rxd_filtered=1 else recessive_limit
filter_counter:=filter_count+1 when rxd_i/=rxd_filtered
filter_counter:=filter count-1 when rxd_i=rxd_filtered (only for cases when the filter count is greater than zero)
rxd_filtered:=rxd_i when filter_count=selected limit
filter_count:=0 when filter_count=selected limit Thus, the present disclosure advantageously increases the CAN oscillator tolerance and/or increases the CAN baudrate. Moreover, the present disclosure does not delay the bit processing by the bit stream processor or the response timing to the CAN node, and the CAN bit stream timing remains unchanged since only the ability to read the bit stream correctly is improved for those nodes which implement this feature. Although it is technically possible to use the present disclosure without changing the CAN protocol, one embodiment enhances the CAN protocol spec as described above. Additionally, the input delay filter may be configured independently from the bit timing settings which increases the time margin for the sampled value. As a result, the sample point may be shifted further towards the end of the bit time. Finally, the input delay filter may be bypassed selectively to reinstate the original bit sampling thus precluding any risk with the bit timing when implementing the present invention. One skilled in the art will also realize that it is not possible to shift the sample point beyond the bit time because the sampled value determines the next transmit level which is placed on the CAN bus with the beginning of the next bit.

As mentioned above, the present disclosure is not limited to any particular bus system but may be used with any appropriate bus system. For example, for a LIN bus system, the present disclosure may be implemented with the timing of the start bit (which provides synchronization) remaining unchanged while the receive value used for bit value sampling is modeled by the filter. The embodiment of the present disclosure in a LIN bus system may delay the reception of a whole frame since there is no immediate response due to CAN nondestructive arbitration and the CAN acknowledge bit. Therefore, a LIN node may just implement the asymmetric receive input filter as a front end receive line filter to combine the general task of glitch filtering with bit stream symmetrization.

In another embodiment of the present disclosure, the bit timing symmetrization component 330 symmterizes the transmitted bit stream. This is done by either transmitting a recessive bit (i.e. dominant to recessive transition when the previous bit was dominant) earlier or by transmitting the dominant bit (i.e. recessive to dominant transition when the previous bit was recessive) later. Thus, the present disclosure improves the symmetry of the CAN bit stream with respect to the rising and falling edges and the duration of 0 and 1 bits, thereby improving the ability of the CAN node to perform correct bit sampling.

More specifically, when the next bit value to be transmitted is 1 (recessive), one embodiment of the present disclosure transmits the recessive level before the start of the next bit time rather than at the beginning of the new bit time. In one embodiment, the present disclosure implements a time counter with a configurable limit value which is started with the sample point and which defines the transmit point of the recessive bit when the counter reaches its limit value. The sample point is theoretically the earliest point in time to transmit the recessive bit because the sample value is needed (along with the current state of the bit stream processor) in order to determine whether the next bit is dominant or recessive. This embodiment of the present disclosure may be implemented within selected CAN nodes since recessive edges are not used for bit synchronization.

In another embodiment of the present disclosure, each transmission on the CAN bus delays every dominant edge (i.e. transmission of a dominant bit) by a common number of time quanta or other time base in order to improve the symmetry of the CAN bit stream. The common number of time quanta or other time base is configurable by the system designer. The timing of the recessive bits remains unchanged since recessive bits are already delayed by the relatively weak CAN bus pullup resistor.

Because the timing of the dominant edges directly determine synchronization, all bit timing units need to take this delay into account. In one embodiment, this is done by shortening the TSEG1 segment (the segment before the sample point) by the same amount after each synchronization event to compensate for the delay. This allows the bit timing segments of all CAN nodes to remain in sync which is required for CAN arbitration and for the acknowledge bit. The implementation of the present disclosure in a LIN bus system would not require this delay compensation and may be implemented only for selected LIN nodes.

Figure 4:
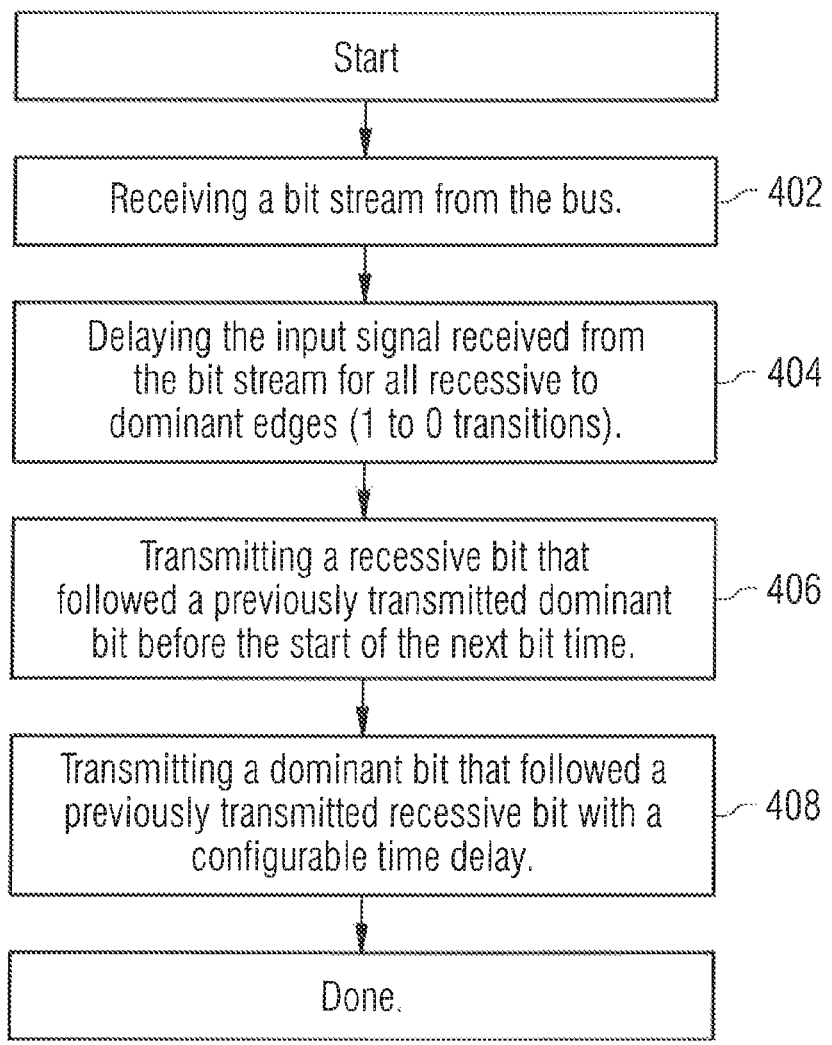
FIG. 4 shows a flow chart of an example method for receiving and transmitting signals via a bus system in accordance with one embodiment of the present disclosure.

FIG. 4 shows a flow chart of an example method for receiving and transmitting signals via a bus system in accordance with one embodiment of the present disclosure. For clarity, the method 400 for receiving and transmitting signals is described in context of the system 100 described in FIGS. 1 through 3. However, in alternate embodiments, other configurations may be used. Moreover, other embodiments may perform the actions described here in different orders and/or other embodiments may perform additional and/or different acts than those described here.

A method for coupling a device to a bus comprises the steps of receiving a bit stream from the bus at 402, symmetrizing the bit stream and transmitting the bit stream to the bus. In one embodiment, symmetrizing the bit stream from the bus may further comprise delaying the input signal received from the bit stream for all recessive to dominant edges (i.e. 1 to 0 transitions) at 404 to improve the bit timing of the bit stream. In another embodiment, the symmetrizing of the bit stream is performed within a bit timing logic component of the bus controller and the received delayed input signal is delayed within the bit timing logic component.

In yet another embodiment, symmetrizing the bit stream may further comprise transmitting a recessive bit, that followed a previously transmitted dominant bit, before the start of the next bit time at 406. The method 400 may also transmit a dominant bit, that followed a previously transmitted recessive bit, with a delay of a configurable amount of time at 408.

Although specific embodiments have been illustrated and described herein, it will be appreciated by those of ordinary skill in the art that a variety of alternate and/or equivalent implementations may be substituted for the specific embodiments shown and described without departing from the scope of the present disclosure. This application is intended to cover any adaptations or variations of the specific embodiments discussed herein. Therefore, it is intended that this invention be limited only by the claims and the equivalents thereof.

What is claimed is:

1. A bus interface for coupling a device to a bus, the bus allowing a plurality of devices to communicate with one another, the bus interface comprising:
    a bit timing component configured to adapt a bit stream to be transmitted over the bus by delaying a transmission of a dominant bit of the bit stream depending on a delay time caused by transmission of a recessive bit of the bit stream, the recessive bit to be transmitted over the bus after stopping transmission of the dominant bit over the bus,
    wherein the bit timing component is further configured to transmit a next recessive bit of the bit stream that followed a previously transmitted dominant bit of the bit stream before a start of a next recessive bit time rather than at the start of the next recessive bit time.

2. The bus interface of claim 1, wherein the bit timing component further comprises an input delay filter configured to delay an input signal received from the bit stream to improve the bit timing of the bit stream.

3. The bus interface of claim 2, wherein the input delay filter is configured to delay a recessive to dominant edge for a given received bit stream.

4. The bus interface of claim 2, further comprising a bit timing logic component, wherein the input delay filter is integrated within the bit timing logic component and wherein the received delayed input signal is delayed within the bit timing logic component.

5. The bus interface of claim 2, wherein the input delay filter further comprises a dominant limit value and a recessive limit value which are configurable.

6. The bus interface of claim 1, wherein the bit timing component is configured to transmit the dominant bit of the bit stream late, after a start of a next bit time.

7. The bus interface of claim 1, wherein the bit timing component is configured to delay the dominant bit of the bit stream a configurable amount of time.

8. The bus interface of claim 1, wherein the bus system is a controlled area network (CAN) bus system.

9. A bus system for receiving and transmitting a bit stream from and to a bus, the bus system comprising:
    a bit timing component configured to adapt the bit stream in advance, before transmitting the bit stream to the bus,
    wherein adapting the bit stream comprises delaying a transmission of a dominant bit of the bit stream depending on a delay time caused by a transmission of a recessive bit of the bit stream, the recessive bit to be transmitted over the bus after stopping transmission of the dominant bit over the bus,
    wherein the bit timing component is configured to adapt the bit stream before transmitting to the bus by transmitting a recessive bit of the bit stream that followed a previously transmitted dominant bit of the bit stream before a start of a recessive bit time.

10. The bus interface of claim 9, wherein the bit timing component further comprises an input delay filter configured to delay an input signal received from the bit stream to improve the bit timing of the bit stream.

11. The bus interface of claim 10, wherein the input delay filter is configured to delay a recessive to dominant edge for a given received bit stream.

12. The bus interface of claim 10, further comprising a bit timing logic component, wherein the input delay filter is integrated within the bit timing logic component and wherein the received delayed input signal is delayed within the bit timing logic component.

13. The bus interface of claim 10, wherein the input delay filter further comprises a dominant limit value and a recessive limit value which are configurable.

14. The bus interface of claim 9, wherein the bit timing component is configured to adapt the bit stream before transmitting the bit stream to the bus by delaying the dominant bit of the bit stream by a configurable amount of time.

15. The bus interface of claim 9, wherein the bus system is a controlled area network (CAN) bus system.

16. A bus interface for coupling a device to a bus, the bus allowing a plurality of devices to communicate with one another, the bus interface receiving and transmitting a bit stream from and to the bus, the bus interface comprising:
- a bit timing component configured to transmit a next recessive bit of the bit stream that followed a previously transmitted dominant bit of the bit stream before a start of a next recessive bit time rather than at the start of the next recessive bit time,
- wherein the bit timing component is configured to transmit a next dominant bit of the bit stream that followed a previously transmitted recessive bit of the bit stream after a start of a next dominant bit time rather than at the start of the next dominant bit time,
- wherein transmission of the next dominant bit of the bit stream is delayed depending on a delay time caused by a transmission of the previously transmitted recessive bit of the bit stream, the next recessive bit to be transmitted over the bus after stopping transmission of the previously transmitted dominant bit over the bus.

17. A method for receiving and transmitting a bit stream from and to a bus, the method comprising:
- adapting a bit stream to be transmitted to the bus, wherein adapting the bit stream comprises delaying a transmission of a dominant bit of the bit stream depending on a delay time caused by a transmission of a recessive bit of the bit stream, the recessive bit to be transmitted over the bus after stopping transmission of the dominant bit over the bus,
- wherein adapting the bit stream comprises advancing transmission of a next recessive bit of the bit stream that followed a previously transmitted dominant bit of the bit stream before a start of a next recessive bit time; and
- transmitting the adapted bit stream to the bus.

18. The method of claim 17, wherein adapting the bit stream comprises delaying transmission of the dominant bit of the bit stream by a configurable amount of time.

19. The method of claim 17, wherein adapting the bit stream comprises sampling the next recessive bit of the bit stream before the start of the next recessive bit time.

20. The method of claim 17, further comprising:
- receiving the adapted transmitted bit stream from the bus, wherein a capacitive loading associated with the bus or receive circuitry coupled to the bus, or both, causes the adapted transmitted bit stream to be received as a symmetrized bit stream.

21. The method of claim 17, further comprising:
- receiving an adapted bit stream from the bus; and
- adapting the received adapted bit stream.

22. The method of claim 21, further comprising delaying an input signal received from the adapted bit stream to improve a bit timing of the bit stream.

23. The method of claim 22, wherein the input signal delay is for a recessive to dominant edge for a given received bit stream.

24. The method of claim 22, wherein the adapting of the received adapted bit stream is performed within a bit timing logic component and the received delayed input signal is delayed within the bit timing logic component.

25. The method of claim 17, wherein the bus system is a controlled area network (CAN) bus system.

* * * * *